March 29, 1966 A. STRICKLER 3,242,796
SLIT CONTROL APPARATUS
Filed April 9, 1962
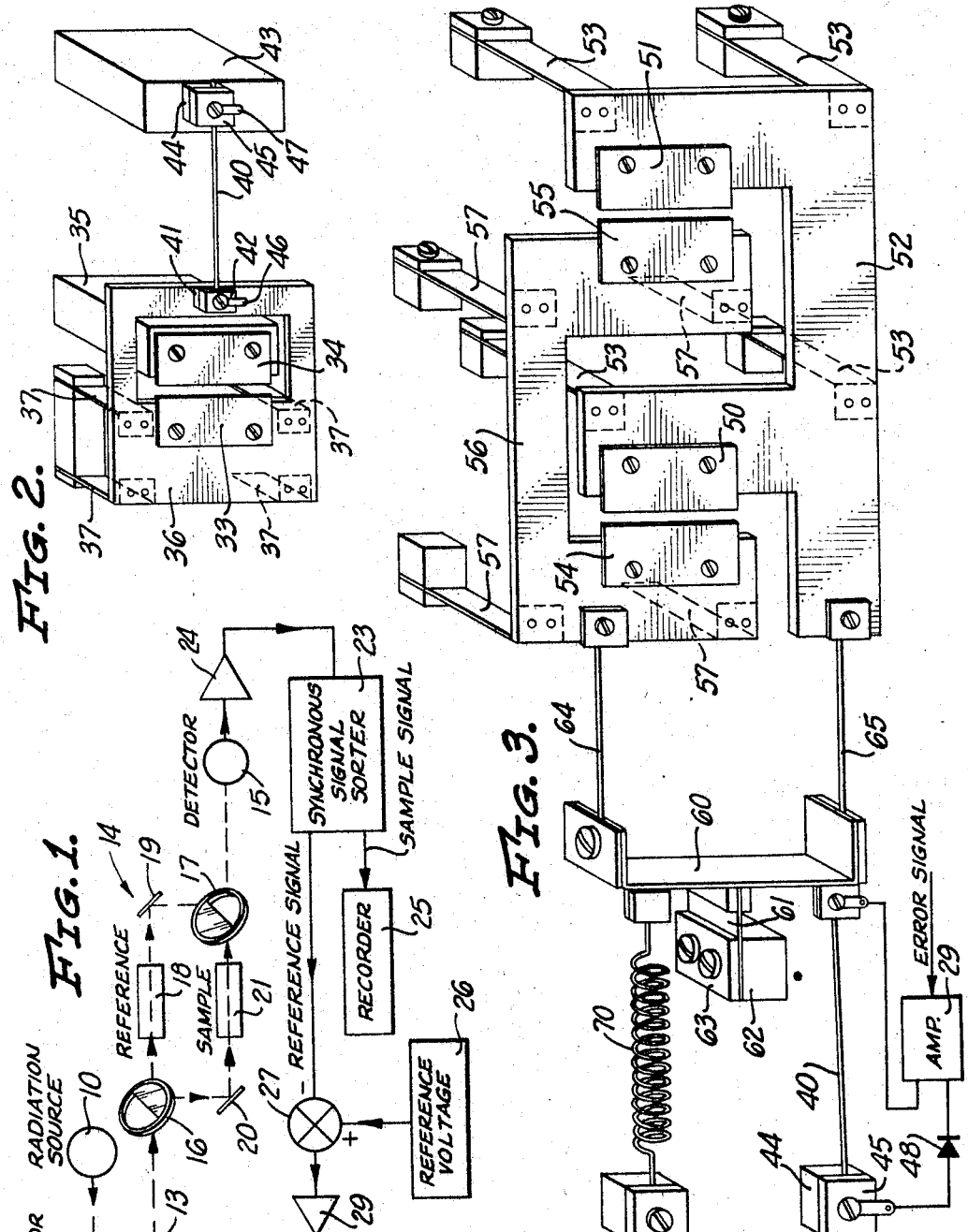
INVENTOR.
ALLEN STRICKLER
BY HIS ATTORNEYS
HARRIS, KIECH, RUSSELL & KERN

3,242,796
SLIT CONTROL APPARATUS
Allen Strickler, Fullerton, Calif., assignor to Beckman Instruments, Inc., a corporation of California
Filed Apr. 9, 1962, Ser. No. 186,189
8 Claims. (Cl. 88—14)

This invention relates to slits in radiation selection equipment such as monochromators and, in particular, to a new and improved apparatus for controlling the movement of slit defining jaws and thereby the width of the slit.

Smooth and accurate control of slit width in monochromators is essential to the versatility and automatic operation of instruments incorporating such radiation control slits. Slit width adjustment affects the spectral resolving power and the speed with which a given spectrum can be scanned at a desired signal-to-noise ratio in a spectrometer. Adjustment of slits is manual in some instruments but usually is automatic in recording instruments, with the slit width varying as a function of the operating wavelength. In a typical instrument, the slit width may vary from a few thousands of a millimeter to several millimeters during a run. The slit jaw adjustment must be very smooth and virtually free of backlash and starting friction, and should be highly stable and reproducible at a given setting of the operating mechanism.

It is an object of the invention to provide a slit control apparatus for the continuous control of radiation passing through a slit which does not require servo motors, gears, cams and other mechanical devices normally utilized in slit drive equipment. A further object is to provide such an apparatus which eliminates wear, backlash and starting friction in the slit drive. A further object is to provide a slit control apparatus having the advantages set out above while providing a relatively high speed of response and a relatively high driving force in a relatively small displacement.

Another object is to provide such an apparatus including means for developing a signal varying as a function of radiant energy passing along a path including the slit, and means for coupling the signal to the wire heating unit as an input for controlling the wire temperature and thereby the wire dimensions and slit width.

It is an object of the invention to provide a slit drive for a monochromator or the like having a pair of jaws defining a slit therebetween with one of the jaws suspended for movement relative to the other jaw to vary the slit width with the drive including a length of wire, means for coupling one end of the wire to the one jaw, means for coupling the other end of the wire to a reference point, and means for heating the wire to vary the length thereof in a controlled manner and thereby move the one jaw to vary the slit width. A further object is to provide such an apparatus including means for connecting the wire as a load on a variable electric power source for controlled heating of the wire. A further object is to provide such an apparatus in which the wire heating means includes an amplifier having an input signal which varies as a function of radiant energy arriving at a detector for controlling the slit width and thereby the energy at the detector.

It is an object of the invention to provide a new and novel slit control apparatus for controlling radiant energy passing through the slit which includes a pair of jaws defining a slit therebetween, a set of reed hinges suspending one of the jaws for movement toward and away from the other jaw, a wire connected between the one jaw and a one reference point, and means for heating the wire to control the length of the wire and the position of the one jaw relative to the reference point and thereby control the slit width. A further object is to provide such an apparatus which may be used with a single slit mechanism and with a multiple slit mechanism. Another object is to provide such an apparatus which may be used to provide unilateral slit jaw movement and to provide bilateral slit jaw movement.

It is a particular object of the invention to provide a radiation control apparatus including a radiation source, a monochromator having a beam control slit with a moving jaw, a beam flicker device for alternately directing a radiation beam through sample and reference zones, a radiation detector, means defining a beam path from the source to the detector through the monochomator and flicker device, circuit means operated in synchronism with the flicker device for separating the output signal of the detector into a reference signal and a sample signal, a source of reference voltage, means for combining the reference voltage and the reference signal to produce an error signal, a wire coupled to the jaw for varying the slit width as a function of wire length, and means for heating the wire as a function of the error signal to control the slit width and maintain the error signal at a minimum.

It is an object of the invention to provide a new method of driving a slit jaw for a monochromator by a mechanical drive train incorporating a wire, the method including the step of selectively heating the wire to axially expand and contract the wire and actuate the jaw through the drive train.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:

FIG. 1 is a diagrammatic representation of a recording spectrophotometer incorporating the novel slit control apparatus;

FIG. 2 is a perspective view of one form of the slit control apparatus; and

FIG. 3 is a perspective view of an alternative form of the apparatus.

The apparatus of FIG. 1 includes a radiation source 10, a monochromator 11 having an entrance slit 12 and an exit slit 13, a beam flicker device 14 and a radiation detector 15. The monochromator 11 may be conventional in design except for the slit jaw drive which will be described in detail hereinbelow and provides a narrow band width of radiation at the exit slit selected from the band of radiation at the entrance slit. The beam flicker device may include half mirrors 16, 17 which are driven in synchronism to alternately direct the beam through a reference material zone 18 and a mirror 19 and through a mirror 20 and a sample material zone 21.

The detector output is coupled to a synchronous signal sorter 23 through an amplifier 24. The detector output signal is typically of rectangular waveform with alternate plateaus representing the reference and sample signal levels. The signal sorter 23 may be a mechanical, vacuum tube or solid state switching circuit operated in synchronism with the mirror drive of the beam flicker device to provide two outputs, one being a sample signal which varies as a function of the radiation through the sample zone 21 and a reference signal which varies as a function of the radiation through the reference zone 18. The output signals are ordinarily filtered to remove the A.C. components. The D.C. sample signal may be recorded in a recorder 25 to provide a direct recording of transmission through the sample zone and hence a record of the sample's absorption spectrum.

For a direct reading system, the reference signal level should be maintained substantially constant as wavelength is varied at the monochromator. This may be accomplished by bucking the reference signal against a fixed reference voltage 26 at a mixing point 27 to provide a difference or error signal for a slit drive 28. The error signal is ordinarily amplified in an amplifier 29 to provide the power necessary for actuating the slit drive. The slit drive narrows or broadens the slits in the monochromator to vary the magnitude of radiant energy leaving the monochromator and maintain the error signal at a null or near zero value. With such a system, the recorded value of the sample signal is proportional to the percent transmission of the sample.

FIG. 2 shows a slit drive for a single unilateral slit. The slit is defined by jaws 33, 34. The jaw 34 is fixed in the instrument frame and is carried on a support member 35. The jaw 33 is movable with respect to the jaw 34 to vary the slit width. The movable jaw may be carried on a jaw carrier member 36 which is supported on four flexible reed hinges 37 to provide substantially frictionless movement of the jaw 33 in the plane of the jaws. The reed hinges 37 are normally biased in a direction tending to hold the jaws open.

A wire 40 is clamped at one end to the jaw carrier 36 between insulating members 41, 42. The other end of the wire 40 is fixed to a reference point as by clamping to a support member 43 between insulating blocks 44, 45. Means are provided for heating the wire to vary its length and thereby move the jaw 33 relative to the jaw 34. Preferably the wire is heated by an electric current therein with the magnitude of the current being controlled to control the wire temperature and hence the wire length. Terminals 46, 47 are provided at the wire mounting points for connecting the electric power source to the wire.

In the preferred arrangement of the invention, the wire 40 is connected as a load on the amplifier 29. It is desirable to have the wire carry a finite current at zero error signal in order to provide control of slit width for both positive and negative error signals. It is desirable to have the wire current unipolar throughout the control operating range since wire heating, and hence wire size, is independent of the polarity of the current. A rectifying element 48 may be connected in series with the wire (FIG. 3) to avoid reversal of wire current which might occur under unusual signal conditions.

A typical wire for use in the slit drive may be of Nichrome 0.010 inch diameter and in the order of three to twelve inches in length. The wire may be operated through a temperature differential in the order of 400° C. While a cylindrical wire has been shown as the slit drive member, it should be kept in mind that the invention is not limited to this particular mechancal shape.

A more complex slit mechanism including two bilateral slits is shown in FIG. 3. The slits may be the entrance slit and the exit slit of the monochromator and may be varied simultaneously and in equal amounts. Jaws 50, 51 are carried on a member 52 which is supported on reed hinges 53. Jaws 54, 55 are carried on another member 56 which is supported on reed hinges 57. One slit is defined by the jaws 50, 54 and the other slit is defined by the jaws 51, 55. A pivot member 60 is mounted on a reed hinge 61 clamped in blocks 62, 63. A rod 64 provides a coupling between one end of the pivot member 60 and the jaw carrier member 56. A similar rod 65 provides a coupling between the other end of the pivot member 60 and the other jaw carrier member 52. The slit drive wire 40 has one end clamped to a reference point in the blocks 44, 45 and the other end clamped to the pivot member 60. The change in length of the wire 40 produces movement of both jaws of each slit with an expansion of the wire increasing the slit width and a contraction of the wire decreasing the slit width. A bias spring 70 may be coupled between the pivot member 60 and the instrument frame if desired. Mechanical amplification of the jaw movement for a given wire size change may be achieved by attaching the wire 40 to the pivot member 60 at a point closer to the pivot hinge 61 than the rods 64, 65 are attached.

In an alternative form, a manually controlled power source may be substituted for the amplifier to provide a manual control of slit width. Also, the wire current may be indicated or recorded on a suitable meter to provide a record of slit width. While the specific embodiments illustrated show the electric power source being connected at substantially the ends of the wire, it should be noted that this is not necessary and the power source can be connected across only a portion of the wire. Similarly, the mechanical connection between the reference point and the jaw carrier can be made between only a portion of the wire while the entire length of the wire or some other portion thereof is used as a load on the power source.

The slit drive mechanism eliminates the conventional motors, gears and cams and the associated wear, backlash and starting friction. The hot wire drive provides a relatively high response speed, typically being in the the order of a second or less. Response time can be improved by continuously moving air past the wire to increase the cooling rate. The hot wire drive provides a relatively high force with a relatively small mechanical displacement which is ideally suited for slit jaw drive.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as may invention:

1. In a slit drive for a monochromator or the like having a pair of jaws defining a slot therebetween with one of said jaws suspended for movement relative to the other jaw to vary the slit width, the combination of:
   a length of wire;
   means for coupling one end of said wire to said one jaw;
   means for coupling the other end of said wire to a reference point;
   an amplifier having said wire connected as a load;
   means for developing a signal varying as a function of radiant energy passing along a path including said slit; and
   means for coupling said signal to said amplifier as an input for controlling the amplifier output to said wire and thereby the wire size and the slit width.

2. A slit drive as defined in claim 1 including a unidirectional conducting device connected in series with said wire.

3. In combination:
   means defining a radiation path from a radiation source to a detector and including at least one set of relatively movable jaws defining a variable width slit in said path;
   a wire coupled between a reference point and one jaw of said slit; and
   control means sensing radiation in said radiation path, said control means connected to said wire and producing a current in said wire as a function of the radiation traversing said path to control the length of said wire and thereby the width of said slit.

4. In combination:
   a radiation source;
   a monochromator having a beam control slit with a moving jaw;
   a beam flicker device for alternately directing a radiation beam through sample and reference zones;
   a radiation detector;

means defining a beam path from said source to said detector through said monochromator and said flicker device;

circuit means coupled to said detector and operated in synchronism with said flicker device for separating the output signal of said detector into a reference signal and a sample signal;

a source of reference voltage;

means connected to receive said reference voltage and said reference signal and producing an error signal;

a wire coupled to said jaw for varying the slit width as a function of wire length; and means connected to receive said error signal for heating said wire as a function of said error signal to control said slit width and maintain said error signal at a minimum, near-zero value.

5. In combination:

means defining a radiation path from a radiation source including a pair of jaws defining a slit therebetween;

a set of reed hinges suspending one of said jaws for movement toward and away from the other jaw;

a wire connected between said one jaw and a reference point; and control means sensing radiation in said radiation path and connected to said wire, said control means heating said wire to control the length of the wire and the position of said one jaw relative to said reference point and hence the slit width as a function of the radiation traversing said path.

6. In combination:

means defining a radiation path from a radiation source including a pair of jaws defining a slit therebetween, one of said jaws being fixed to a frame;

a set of reed hinges suspending the other of said jaws from said frame for movement in a plane toward and away from the one jaw;

a wire connected between said other jaw and said frame and disposed in the plane of motion of said other jaw, and control means sensing radiation in said radiation path and connected to said wire, said control means heating said wire to control the length of the wire and move said other jaw relative to said one jaw and hence control the slit width as a function of the radiation traversing said path.

7. In combination:

a monochromator having first and second carrier members mounted therein;

first and second sets of reed hinges for suspending said first and second members, respectively, from a frame for movement in a plane toward and away from each other;

a first pair of jaws defining an entrance slit and carried on said first and second members respectively;

a second pair of jaws defining an exit slit and carried on said first and second members respectively;

a pivot member mounted on said frame for pivoting about an axis;

first means for coupling said first carrier member to said pivot member on one side of said axis;

second means for coupling said second carrier member to said pivot member on the other side of said axis;

a wire connected between said pivot member and said frame;

a radiation source;

means defining a beam path from said source through said entrance and exit slits of said monochromator; and control means sensing radiation in said path and connected to said wire, said control means heating said wire to control the length of said wire and move said jaws toward and away from each other as a function of the radiation traversing said path.

8. A method of driving a slit jaw in a monochromator including the steps of:

sensing the radiation emanating form said monochromator; and heating a wire in a mechanical drive train to axially expand and contract the wire to continuously control the position of the slit jaw as a function of the emanating radiation.

References Cited by the Examiner

UNITED STATES PATENTS

| 1,292,105 | 1/1919 | Shoenberg | 60—23 |
| 1,804,709 | 5/1931 | Shoenberg | 60—23 |
| 2,587,451 | 2/1952 | Farrand | 88—61 |
| 2,782,682 | 2/1957 | Browning et al. | 88—40 |
| 2,857,808 | 10/1958 | Hastings | 88—40 |
| 2,926,293 | 2/1960 | Camm et al. | 310—4.1 |
| 2,987,958 | 6/1961 | Marshall | 88—61 |
| 3,098,408 | 7/1963 | Cary | 88—61 |

JEWELL H. PEDERSEN, *Primary Examiner.*

R. L. WIBERT, *Assistant Examiner.*

UNITED STATES PATENT OFFICE
CERTIFICATE OF CORRECTION

Patent No. 3,242,796                                    March 29, 1966

Allen Strickler

It is hereby certified that error appears in the above numbered patent requiring correction and that the said Letters Patent should read as corrected below.

Column 1, line 22, for "thousands" read -- thousandths --; line 70, strike out "one", second occurrence; column 4, line 37, for "may" read -- my --; line 39, for "slot" read -- slit --.

Signed and sealed this 6th day of June 1967.

(SEAL)
Attest:

Edward M. Fletcher, Jr.                            EDWARD J. BRENNER

Attesting Officer                                        Commissioner of Patents